(12) United States Patent
Ryan

(10) Patent No.: US 11,441,685 B2
(45) Date of Patent: Sep. 13, 2022

(54) ROTARY FACE SEAL WITH MAGNETIC PULLER LOADING

(71) Applicant: Magnetic Seal LLC, Warren, RI (US)

(72) Inventor: Paul Richard Ryan, Carver, MA (US)

(73) Assignee: Magnetic Seal LLC, Warren, RI (US)

( * ) Notice: Subject to any disclaimer, the term of this patent is extended or adjusted under 35 U.S.C. 154(b) by 374 days.

(21) Appl. No.: 15/649,246

(22) Filed: Jul. 13, 2017

(65) Prior Publication Data

US 2018/0017167 A1 Jan. 18, 2018

Related U.S. Application Data

(60) Provisional application No. 62/362,348, filed on Jul. 14, 2016.

(51) Int. Cl.
*F16J 15/34* (2006.01)
*F16J 15/00* (2006.01)
*F16J 15/3252* (2016.01)
*F16J 15/3268* (2016.01)

(52) U.S. Cl.
CPC ......... *F16J 15/3436* (2013.01); *F16J 15/002* (2013.01); *F16J 15/3412* (2013.01); *F16J 15/3416* (2013.01); *F16J 15/3444* (2013.01); *F16J 15/3252* (2013.01); *F16J 15/3268* (2013.01)

(58) Field of Classification Search
CPC ...... F16J 15/3444; F16J 15/3404; F16J 15/34; F16J 15/348; F16J 15/16
See application file for complete search history.

(56) References Cited

U.S. PATENT DOCUMENTS

| | | | | |
|---|---|---|---|---|
| 3,109,660 A | * | 11/1963 | Wahl | F16J 15/38 277/375 |
| 3,161,414 A | * | 12/1964 | Porges | F16J 15/38 277/371 |
| 3,239,232 A | * | 3/1966 | Andresen | F16J 15/38 277/397 |
| 3,708,177 A | * | 1/1973 | Baermann | F16J 15/3444 277/378 |
| 4,304,408 A | * | 12/1981 | Greenawalt | F16J 15/348 277/373 |
| 4,389,051 A | * | 6/1983 | Mullaney | F16J 15/3452 277/373 |

(Continued)

*Primary Examiner* — Vishal A Patel
(74) *Attorney, Agent, or Firm* — Barlow, Josephs & Holmes, Ltd.; David R. Josephs

(57) ABSTRACT

The rotary face seal with magnet loading replaces known spring mechanisms with magnetic technology that provides a consistent load with minimal variation, which is not affected by natural frequency and material fatigue due to cyclic loading. This improves seal performance and service life. The tubular magnetic ring is advantageous because it replaces existing seals within stationary cartridge with a puller type magnetic assembly design that results with the stationary cartridges being an exact exchange. The use of magnetic technology attached to the outside diameter of the rotating mating ring, which is attached to the shaft, that does not produce eddy currents because it is of a single pole configuration. The single pole magnetic assembly design is achieved by either axial or radial magnet orientation, such as in the form of a tubular magnetic band locating in a circumferential notch in the rotating mating ring.

8 Claims, 4 Drawing Sheets

(56) References Cited

U.S. PATENT DOCUMENTS

| | | | | |
|---|---|---|---|---|
| 4,625,977 | A * | 12/1986 | Azibert | F16J 15/008 |
| | | | | 277/361 |
| 4,795,168 | A * | 1/1989 | Adams | F16C 33/78 |
| | | | | 277/378 |
| 5,078,411 | A * | 1/1992 | Geco | F16J 15/3444 |
| | | | | 277/378 |
| 5,730,447 | A * | 3/1998 | Dawson | F16J 15/3444 |
| | | | | 277/378 |
| 6,446,976 | B1 | 9/2002 | Key et al. | |
| 6,805,358 | B2 * | 10/2004 | Dawson | F16J 15/3444 |
| | | | | 277/347 |
| 8,474,826 | B2 * | 7/2013 | Villeneuve | F16J 15/3444 |
| | | | | 277/377 |
| 2003/0057651 | A1 * | 3/2003 | Nantua | F16C 33/7879 |
| | | | | 277/351 |
| 2006/0244221 | A1 | 11/2006 | Villeneuve et al. | |
| 2007/0194536 | A1 * | 8/2007 | Nobrega | F16J 15/3444 |
| | | | | 277/378 |
| 2008/0042364 | A1 | 2/2008 | Zheng et al. | |
| 2008/0050261 | A1 * | 2/2008 | Roddis | F16J 15/348 |
| | | | | 418/104 |

\* cited by examiner

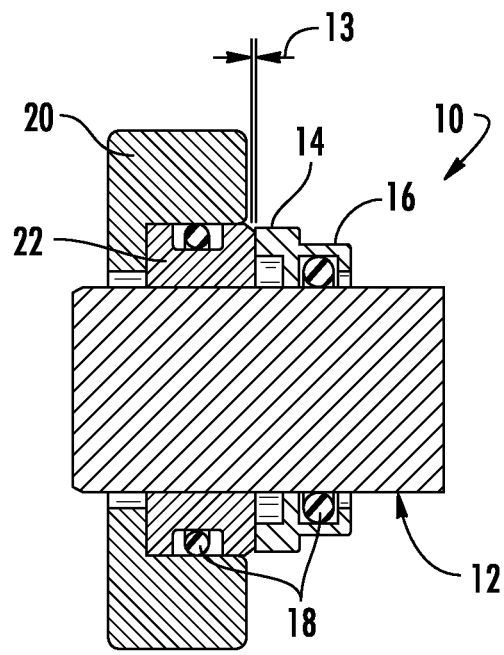
FIG. 1
(PRIOR ART)
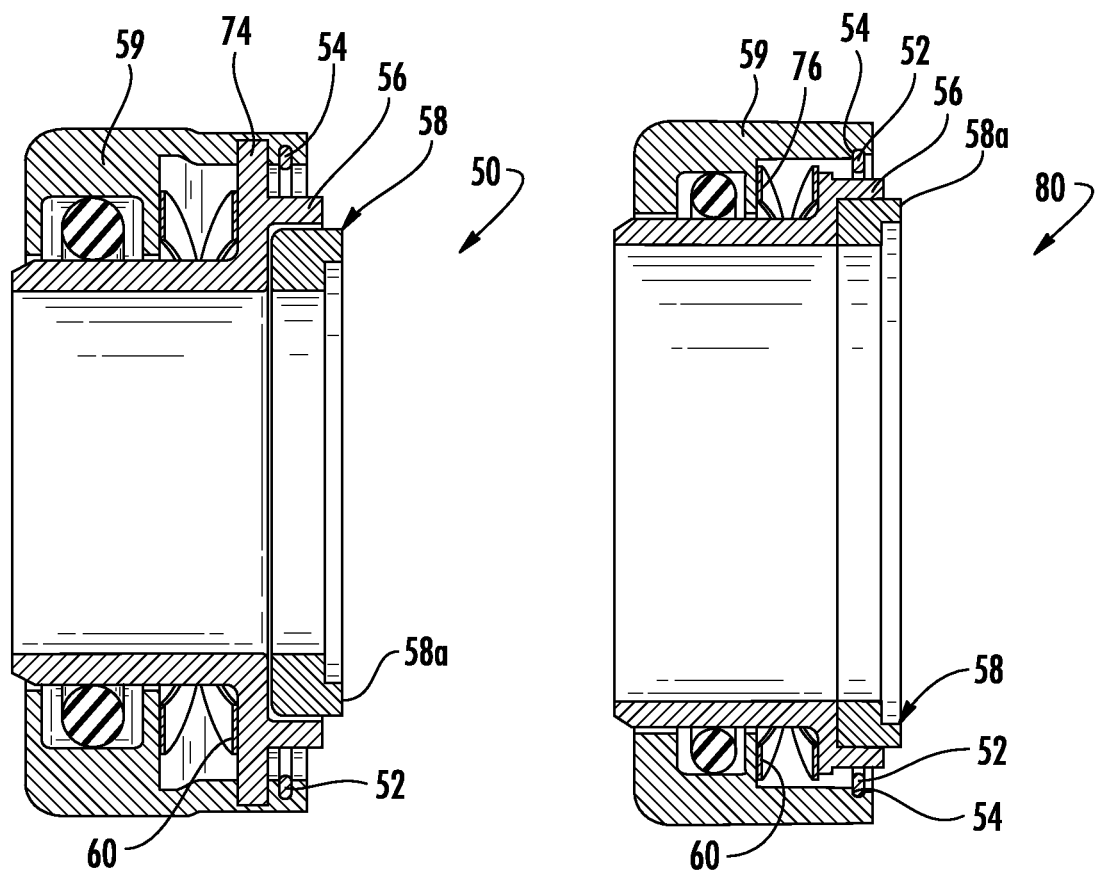
FIG. 2
(PRIOR ART)
FIG. 3
(PRIOR ART)

ROTARY FACE SEAL WITH MAGNETIC PULLER LOADING

CROSS REFERENCE TO RELATED APPLICATION

This patent application claims priority to earlier filed U.S. Provisional Application Ser. No. 62/362,348, filed Jul. 14, 2016 the entire contents of which are incorporated herein by reference.

BACKGROUND OF THE INVENTION

The invention relates generally to mechanical rotary face seals. Such mechanical rotary face seals are typically used to seal media (gas or fluid) between the shaft and the housing where one is stationary and the other is rotating. These seals are used in the aerospace industry, commercial industry, nuclear industry, and other high reliability industries, such as, test equipment and race car engines and transmissions or the like.

There are a number of problems and concerns typically associated with known mechanical rotary face seals. Standard mechanical rotary face seals use a spring mechanism for the mechanical load that provides positive contact against the rotary mating surface that is either a separate ring attached to shaft, shaft flange or end face, or a bearing inner race. The spring mechanism's loading can have a large variation caused by operating range (stroke) length, compromised when it's natural frequency is reached during operation from shock and vibration, and load reduction (weakening) due to material fatigue under cyclic loading and temperature extremes.

There have been a number of attempts in the prior art to address these common problems.

For example, U.S. Pat. No. 3,708,177 for Magnetic Seal for a Rotary Shaft and Magnet Therefor addresses the well-known eddy current issue but it is unknown if the design was commercially feasible. U.S. Pat. No. 4,795,168 for a Magnetic Seal Assembly does not address the eddy current issue because the magnet inserts rotate. U.S. Pat. No. 5,078,411 for Variable Magnetic Rotary Seal does not address the eddy current issue because the magnet inserts rotate. U.S. Pat. No. 5,730,447 for Self-Aligning Magnetic Rotary Seal also does not address the eddy current issue because the magnet inserts rotate. U.S. Pat. No. 6,805,358 for Magnetic Seal also does not address the eddy current issue because either the magnet inserts rotate or the magnetically attractive member is exposed to continuously changing north and south poles during rotation.

FIGS. 1-3 show three prior art rotary face seals in detail. Referring first to FIG. 1, a rotary magnetic seal 10 is shown about a shaft 12 where the seal load is controlled by an air gap 13 with minimum variation. A magnet 22 is mounted in a non-magnetic housing 20. A seal case 16 rotates with the shaft 12 and is magnetically pulled toward the magnet 22 to maintain the seal via a face of a seal ring 14 against the magnet 22. Known magnets for this purpose are so well known in the art, they do not need to be discussed in detail herein. Also, various elastomers in the form of O-rings 18 are mounted thereon for shock and vibration, and to maintain surface flatness.

Frictional heat dissipation is achieved due to thermal conductivity. However, different seal designs for high pressure and pressure reversal require customer hardware modification. There is installation sensitivity and has a shaft finish requirement for O-ring drive. The magnet 22 must be installed into the housing 20 and there must be proper seal face mating for proper operation. O-ring drive pre-load can increase the frictional generation at the seal face while a negative roll of the O-ring 18 can cause seal face separation, that can also be due to handling, installation, axial shaft movement, and others. There could also be drive O-ring deterioration (fluid compatibility). The selection of materials is restricted due to the use of magnetics. Moreover, there are uncertain production yield rates for magnets that are used.

In FIGS. 2 and 3, further prior art rotary face seal designs 50 and 70 are shown. It includes an anti-rotation design that uses two (2) tangs 52 on the seal case 56 that engage slots 54 in the cup 59 which permits fluid movement in this area. It has a removable "take apart" cartridge design that facilitates repair, replacement and inspection of internal parts. It has a solid outside diameter cup option with internal milled tangs 52 and seal case slots 54. FIG. 2 shows an embodiment with outward radial tangs 74 on the seal case 56 that engages slots in the cup 59. As a further variation, FIG. 3 shows a solid outer diameter option with internal radial tangs 76 in the cup 59 that engages slots in the seal case 56.

High pressure, low pressure and reverse pressure capability is achieved within the same cartridge by adjusting the diameters of the seal ring 58. Since it does not employ magnets, there is unrestricted selection of materials for construction. However, the slotted OD design is not practical for all applications with the majority using the internal milled tangs 52 with slots 54 in the seal case 56. There is spring load variation due to operating range and the spring load decreases as the seal ring 58 wears compromising re-seating. A wave spring 60 resides between the seal case 56 and the cup to spring-bias them apart. Also, the natural frequency of wave spring 60 is unknown and could cause loading issues under shock and vibration conditions. Moreover, the rotary mating surface which bears against the seal ring 58 mating surface 58a is not always part of the seal design, namely, the bearing inner face, integral with the shaft (not shown) and the mating ring (not shown) obtained from multiple suppliers These solutions are not enough. In view of the foregoing, there is a demand for a rotary face seal that combines the best features of a magnet rotary seal with a non-magnetic seal to avoid the shortcomings associated with prior art rotary face seals.

SUMMARY OF THE INVENTION

The present invention preserves the advantages of prior art rotary face seals. In addition, it provides new advantages not found in currently available rotary face seals and overcomes many disadvantages of such currently available rotary face seals.

The invention is generally directed to the novel and unique rotary face seal that has magnetic loading. The rotary face seal with magnetic loading of the present invention replaces the spring mechanism with magnetic technology to provide a consistent load with minimal variation, which is not affected by natural frequency and material fatigue due to cyclic loading. This will improve seal performance and service life by eliminating the issues that compromise the effectiveness of the spring mechanism. The magnetic technology results in a design that uses magnetic technology attached to the outside diameter of the rotary annular ring which is attached to the shaft that does not produce eddy currents because it is of a single pole design. The single pole magnetic assembly design is achieved by either axial or radial magnet orientation. The magnetic pull is preferably provided by a tubular magnetic band.

It is therefore an object of the present invention to provide improved rotary face seal that overcomes the shortcomings associated with the prior art and provides vastly improved performance compared to such prior art designs.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 1 is cross-sectional view of a known prior art rotary seal construction that uses magnets;

FIG. 2 is a cross-sectional view of a known prior art rotary seal construction that uses wave springs;

FIG. 3 is a cross-sectional view of a second known prior art rotary seal construction that uses wave springs;

DESCRIPTION OF THE INVENTION

The rotary face seal of the present invention with magnet loading replaces the spring mechanism or a magnet installed in a housing with improved magnetic technology that provides a more consistent load with minimal variation, which is not affected by natural frequency and material fatigue due to cyclic loading. This improves the seal performance and service life by eliminating the issues that compromise the effectiveness of the spring mechanism. The present invention as envisioned uses magnetic technology attached to the outside diameter of the rotary ring which is attached to the shaft. The single pole magnetic assembly design is achieved by either axial or radial magnet orientation. Thus, the tubular and single pole design of the magnet used in the present invention does not produce eddy currents due to its configuration and design.

Figure 4:
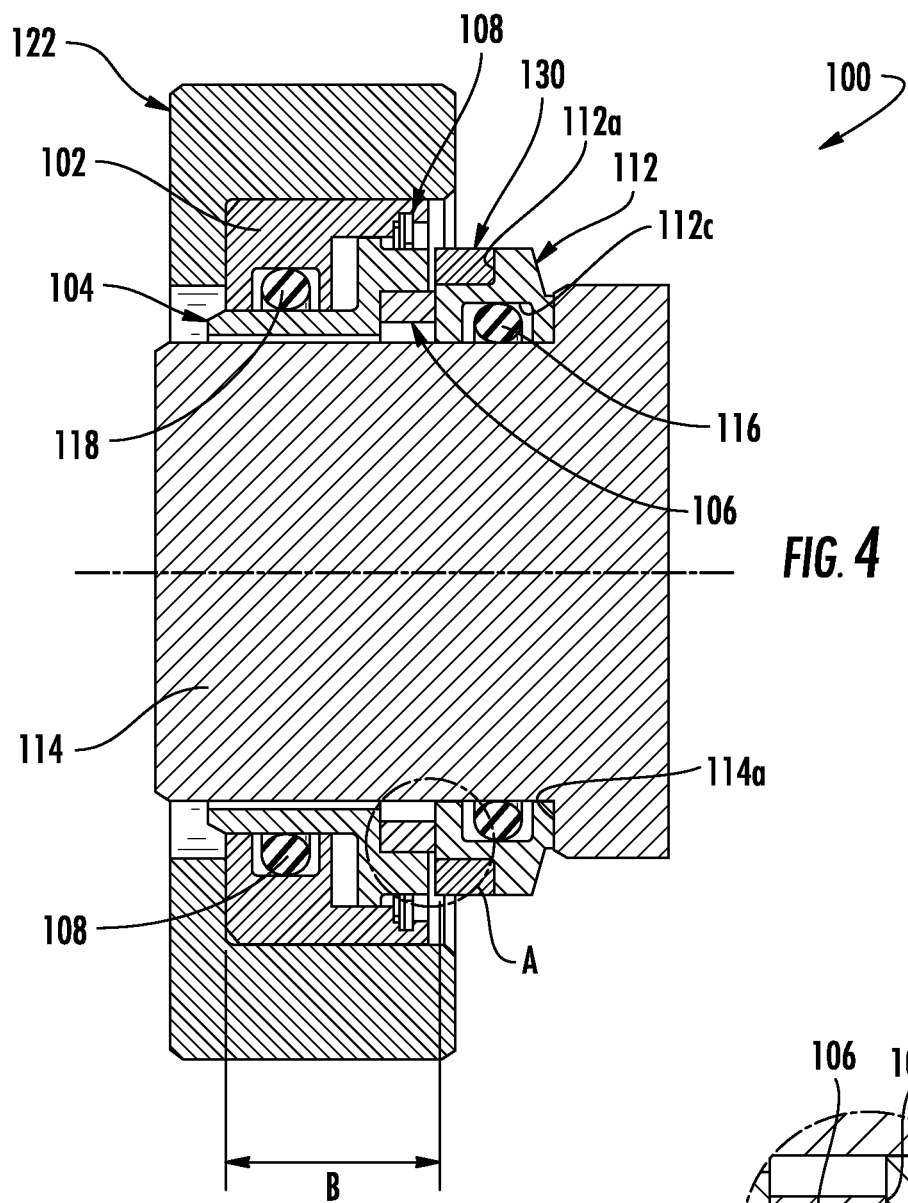
FIG. 4 is a cross-sectional view of a first embodiment of the invention.
Figure 5:
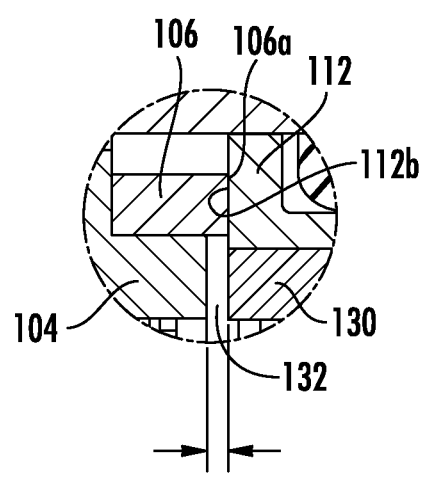
FIG. 5 is a close-up view of the air gap between the seal case and the rotating mating ring.

Referring to FIGS. 4 and 5, which is a close-up view of the gap between the tubular magnet 130 and seal case 104, of the rotary face seal 100 of the present invention is shown to include a basic cartridge rotary face seal that is comprised of a cup 102, seal case 104 with inserted seal ring 106 that fits into the cup 102 with an anti-rotation feature that includes a retaining ring 108 that resides in a groove 110 in the cup 102. The cup 102, in turn, resides in a stationary housing 120 to complete the cartridge configuration. This anti-rotation structure prevents the seal case 104 from rotation when the seal ring 106 contacts a rotating mating face of the mating ring 112 that rotates with shaft 114 due to being held in place by O-ring 116 in seat 112c.

Any type of configuration may be used for attaching the rotating mating ring 112 to the shaft 114, such as the use of O-rings, as shown. In addition, there may be a positive drive with an internal O-ring as secondary seal engagement the shaft with either radial of axial tangs that engage slots in the shaft. Or, there may be the reverse engagement with slots in the mating ring engaging tangs on the shaft. Also, there may be a positive drive with an internal O-ring as secondary seal engagement with the shaft with either radial of axial pins that engage the shaft. Further, there may be a reverse engagement with pins in the shaft engaging with the mating ring. Further, there may be a positive drive with an internal O-ring as secondary seal by using an axial clamping sleeve or a positive drive without an internal O-ring as secondary seal by using an axial clamping sleeve.

Also, an internal O-ring 118 resides in the cup 102 which interfaces with the seal case 104 to provide a secondary seal while allowing axial movement of the seal case 104 within the cup 102 along the shaft axis 114b. The seal case 104 is preferably a metal alloy, as is well-known in the art. Known O-ring designs and materials may be used, which are known in the art for the purposes indicated herein. For example, various elastomers may be used, which may or may not be pre-swollen. An internal retaining ring 108 in the cup 102 that prevents the seal case 104 from becoming disengaged from the cup 102.

The mechanical load in the rotating mating ring 112 rather than in the cartridge (cup 102 and seal case 104). The rotating mating 112 ring has a seat 112a that receives a magnetic tubular or annular band 130 on the outside, which is attached thereto, that pulls the seal face 106a of the seal ring 106 and the seal face 112b of the rotating mating ring 112 together by the magnetic attraction between the magnet 130 and the seal case 104, which is made of a ferro-magnetic material. As a result, the load is controlled by the non-magnetic seal ring 106 from the seal case 104 and the air gap 132 therebetween, as best seen in FIG. 5. The magnet 130 is preferably a tubular band is magnetized either through the width (axially) so that the magnetic poles are on opposite ends or through the radial wall so that magnetic poles are on the outside diameter and the inside diameter. These magnetic orientations result in magnetic circuits that do not produce eddy currents. Further, the force, travel and the attraction profile of the tubular magnet band may be further modified to suit the application at hand. The seal ring 106 may be any material suitable for the application at hand, such as carbon graphite, and the like. Therefore, the rotary face seal of the present invention eliminates the risks associated with and overcome the shortcomings of prior art designs.

Figure 6:
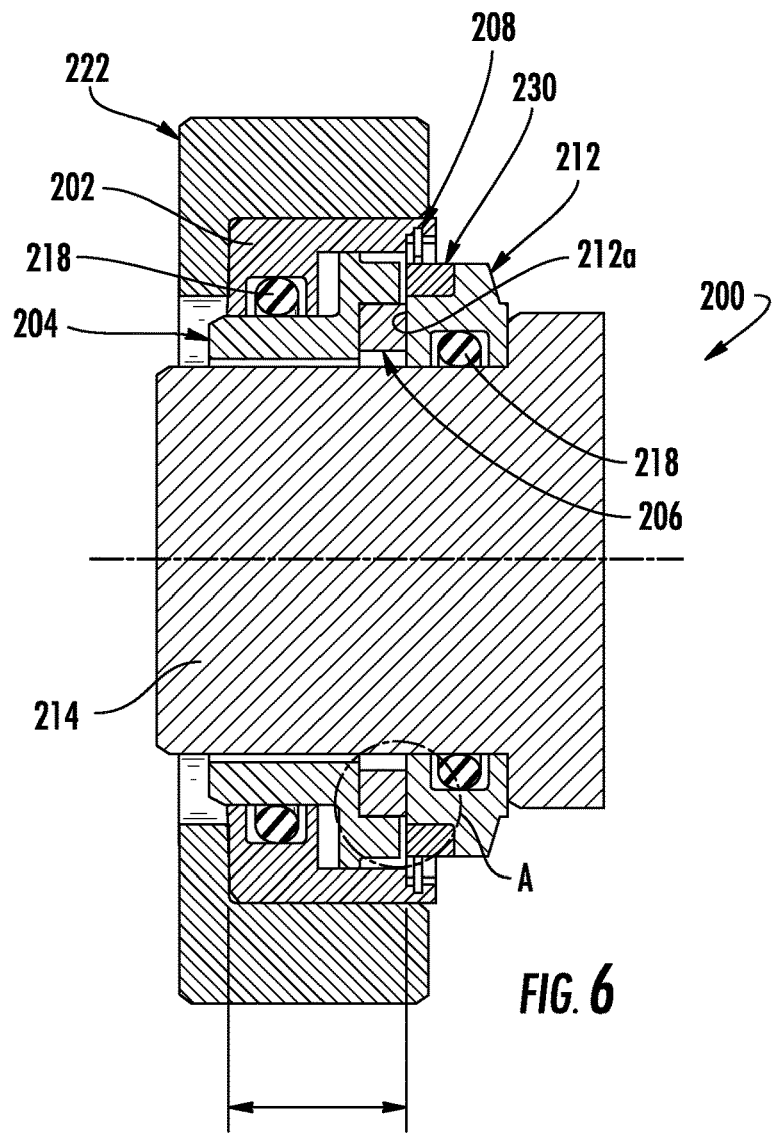
FIG. 6 is a is a cross-sectional view of a second embodiment of the invention with hydrodynamic lift-off grooves in the seal face of the rotating mating ring.
Figure 7:
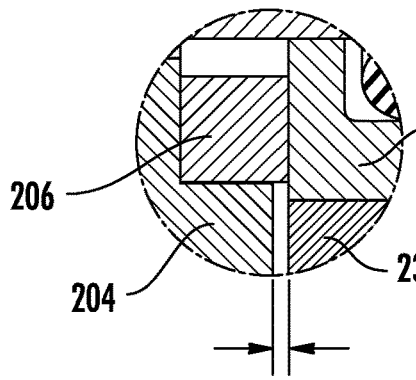
FIG. 7 is a close-up view of the air gap between the seal case and the rotating mating ring of the embodiment of FIG. 5.
Figure 8:
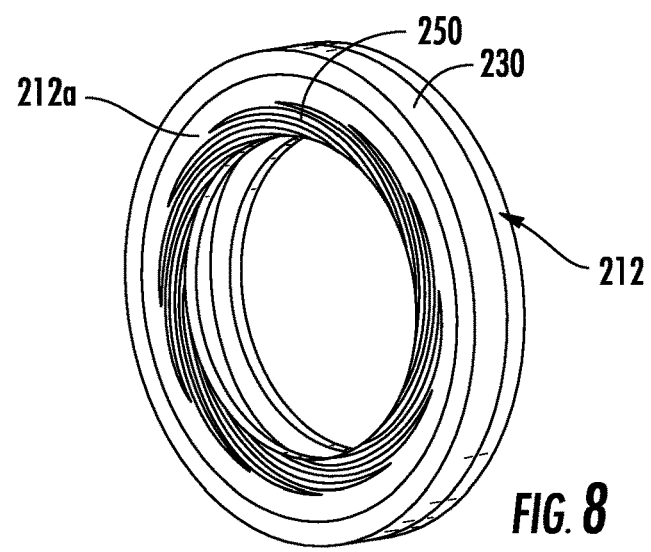
FIG. 8 is an end view of the seal face of the rotating mating ring showing the hydrodynamic lift-off grooves.
Figure 9:
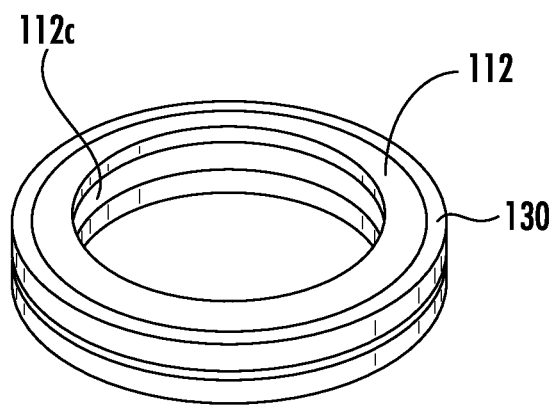
FIG. 9 is a front perspective view of the rotating mating ring with tubular magnet installed therein.

Turning now to FIGS. 6-8, a first alternative embodiment 200 of the present invention of FIG. 4 is shown. As seen in FIG. 6 and the close-up view of FIG. 7, the alternative embodiment 200 is similar to the first embodiment 100 except that the rotating mating ring 212 has a bearing surface 212a, which incorporates lift-off technology using hydrodynamic grooves. The grooves 250 can be best seen in FIG. 8, which is an end view of the bearing face 212a of the rotating mating ring 212. It should be noted that the configuration of the grooves 250 is shown by way of example, and it should be understood that any type, configuration and array of grooves 250 may be used in connection with the alternative embodiment 200 to provide the benefits of such hydrodynamic lift-off grooves.

The alternative embodiment 200 has all of the same other components as the first embodiment, such as a cup 202, seal case 204, with seal ring 206 where the tubular/annular magnet 230, which is attached to the rotating mating ring 212, draws the seal faces of the seal ring 206 and the rotating mating ring 212 toward each other to maintain the desired seal. The entire seal assembly 200 receives a shaft 214 to be sealed.

Figure 10:
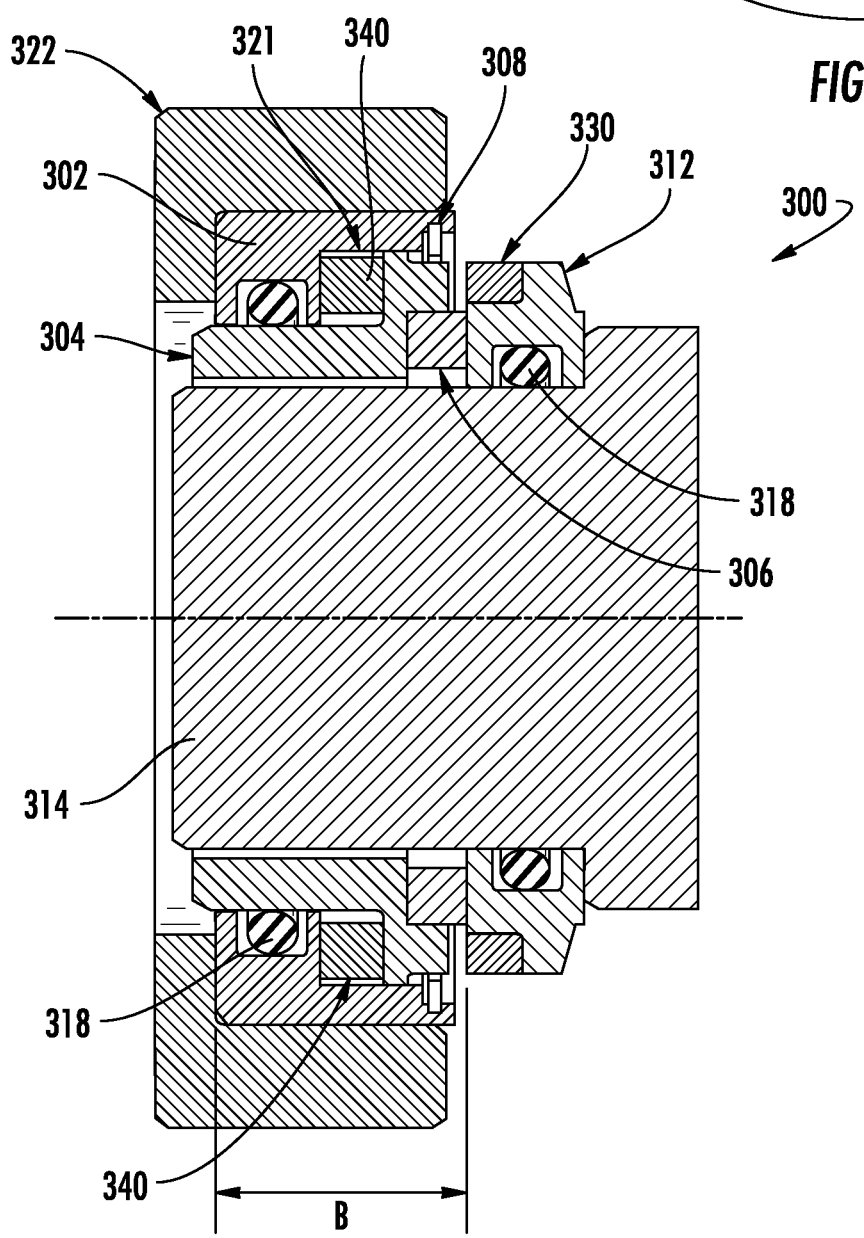
FIG. 10 is a cross-sectional view of a further alternative embodiment of the present invention that further includes a supplemental pusher spring in the cavity between the cup and the seal case.

FIG. 10 shows yet another embodiment of the present invention that further includes a pusher assembly 340 that resides directly in the cartridge to supplement the puller magnetic tubular band 330 on the mating ring outside diameter. The outward pusher assembly may be mechanical, such as a wave spring or metal bellows, or magnetic in the form of repelling magnets. If a metal bellows is used for the pusher assembly, it is preferably attached to the cup and the seal case to eliminate one of the O-rings as a secondary seal, the anti-rotation feature between the seal case and the cup and the internal retaining ring. This outward pusher assembly resides in the cavity 321 between the seal case 304 and the cup 302. In this alternative embodiment 300, the primary seal face loading is provided by the attraction between the seal case 304 and the mating ring 312 with the magnetic tubular band 330 on the outside diameter, and the supplemental pusher assembly 340 in the cartridge provides a low redundant mechanical load which restores mating of the seal faces should they become separated under extreme operating conditions.

It would be appreciated by those skilled in the art that various changes and modifications can be made to the illustrated embodiments without departing from the spirit of the present invention. All such modifications and changes are intended to be covered by the appended claims.

What is claimed is:

1. A rotary face seal with magnetic loading which sealingly couples a shaft to a stationary housing, comprising:
   the stationary housing having a seat;
   a cup having an inwardly facing groove and a central bore, the cup being disposed in the stationary housing; and the shaft located in the central bore;
   a seal case residing between the cup and the shaft;
   an O-ring residing in the inwardly facing groove of the cup to sealingly interface the cup with the seal case providing a secondary seal and allowing axial movement of the seal case within and relative to the cup;
   a retaining ring connecting the cup to the seal case thereby preventing the seal case from becoming disengaged from the cup;
   a seal ring at least partially axially aligned with and in communication with the seal case;
   a rotating mating ring, having a seal face in communication with the seal ring; the rotating mating ring rotating with the shaft;
   a magnetized band connected to the rotating mating ring; the magnetized band and the seal case being magnetically attracted to and pulled toward each other thereby providing a mechanical puller load assembly in the rotating mating ring thereby urging the seal case toward the rotating mating ring and the seal ring into sealing communication with the seal face of the rotating mating ring,
   wherein the magnetized band is axially oriented and magnetized with a single pole adjacent to the seal case, and
   wherein the seal ring maintains an air gap, in an axial direction, between the seal case and the magnetized band.

2. The rotary face seal of claim 1, further comprising:
   wherein complementary structures on the seal case and in the cup to prevent rotation of the seal case relative to the cup when the seal ring contacts a rotating mating face.

3. The rotary face seal of claim 1, wherein the magnetized band resides in a circumferential notch in the rotating mating ring.

4. The rotary face seal of claim 1, wherein the rotary face seal is configured and arranged as a self-contained cartridge.

5. The rotary face seal of claim 1, wherein the rotating mating ring further includes a groove with an O-ring residing therein with the O-ring in communication with the shaft to secure the rotating mating ring to the shaft to effectuate rotation of the rotating mating ring with the shaft.

6. The rotary face seal of claim 1, wherein the seal face of the rotating mating ring further includes a plurality of hydrodynamic grooves.

7. The rotary face seal of claim 1, wherein the magnetized band is an annular ring.

8. The rotary face seal of claim 1, wherein the magnetized band does not produce eddy currents.

* * * * *